(12) United States Patent
Nakamura

(10) Patent No.: US 10,068,615 B2
(45) Date of Patent: Sep. 4, 2018

(54) CAPTURE EXECUTION/NON-EXECUTION CONTROL DEVICE, CAPTURE EXECUTION/NON-EXECUTION CONTROL METHOD, PROGRAM, AND INFORMATION STORAGE MEDIUM

(71) Applicant: Sony Computer Entertainment Inc., Tokyo (JP)

(72) Inventor: Koji Nakamura, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 14/510,459

(22) Filed: Oct. 9, 2014

(65) Prior Publication Data
US 2015/0116293 A1   Apr. 30, 2015

(30) Foreign Application Priority Data
Oct. 24, 2013   (JP) ................................ 2013-221393

(51) Int. Cl.
*G11B 27/10*   (2006.01)
*A63F 13/00*   (2014.01)
(Continued)

(52) U.S. Cl.
CPC .............. *G11B 27/10* (2013.01); *A63F 13/00* (2013.01); *A63F 13/71* (2014.09); *A63F 13/75* (2014.09);
(Continued)

(58) Field of Classification Search
CPC .............. G11B 27/10; G11B 20/00086; H04N 21/4781; H04N 21/4542; H04N 21/4334; A63F 13/71; A63F 13/75; A63F 13/86
See application file for complete search history.

(56) References Cited

U.S. PATENT DOCUMENTS

| 7,470,192 B2 | 12/2008 | Yamamoto |
| 7,607,131 B2 | 10/2009 | Oe |

(Continued)

FOREIGN PATENT DOCUMENTS

| CN | 101465962 A | 6/2009 |
| CN | 102567446 A | 7/2012 |

(Continued)

OTHER PUBLICATIONS

Office Action for corresponding JP Patent Application No. 2013221393, pp. 1-4, dated Jan. 26, 2016.
(Continued)

*Primary Examiner* — Aneeta Yodichkas
(74) *Attorney, Agent, or Firm* — Matthew B. Dernier, Esq.

(57) ABSTRACT

A capture execution/non-execution control device includes a display controller that carries out control to cause an image generated through execution of a program to be displayed on a display unit, and a capture level value acquirer that acquires a capture level value indicating the degree of permission or prohibition of capture of an image displayed on the display unit. The capture execution/non-execution control device further includes a reference value acquirer that acquires a reference value serving as a criterion as to whether or not capture of an image is permitted, and a capture execution/non-execution controller that controls whether or not to execute capture of the image displayed on the display unit according to a result of comparison between the capture level value acquired and the reference value acquired.

10 Claims, 6 Drawing Sheets

(51) Int. Cl.
*A63F 13/86* (2014.01)
*A63F 13/75* (2014.01)
*A63F 13/71* (2014.01)
*H04N 21/433* (2011.01)
*H04N 21/454* (2011.01)
*H04N 21/478* (2011.01)
*G11B 20/00* (2006.01)

(52) U.S. Cl.
CPC ......... *A63F 13/86* (2014.09); *H04N 21/4334* (2013.01); *H04N 21/4542* (2013.01); *H04N 21/4781* (2013.01); *G11B 20/00086* (2013.01)

(56) References Cited

U.S. PATENT DOCUMENTS

| | | | |
|---|---|---|---|
| 8,208,040 | B2 | 6/2012 | Nakase |
| 8,417,097 | B2 | 4/2013 | Adachihara |
| 8,655,151 | B2 | 2/2014 | Yasuda |
| 9,242,173 | B2 | 1/2016 | Kwon |
| 2002/0099837 | A1 | 7/2002 | Oe |
| 2005/0164784 | A1 | 7/2005 | Yamamoto |
| 2008/0113812 | A1 | 5/2008 | Kwon |
| 2009/0118008 | A1* | 5/2009 | Kobayashi ............. A63F 13/10 463/31 |
| 2009/0131177 | A1* | 5/2009 | Pearce .................. A63F 13/10 463/43 |
| 2009/0153676 | A1 | 6/2009 | Nakase |
| 2009/0208181 | A1* | 8/2009 | Cottrell ................. A63F 13/00 386/278 |
| 2009/0305782 | A1* | 12/2009 | Oberg .................... A63F 13/10 463/31 |
| 2012/0099842 | A1 | 4/2012 | Yasuda |
| 2016/0210107 | A1 | 7/2016 | Takahashi |

FOREIGN PATENT DOCUMENTS

| | | |
|---|---|---|
| JP | 11249965 A | 9/1999 |
| JP | 200344297 A | 2/2003 |
| JP | 2003203133 A | 7/2003 |
| JP | 2005211212 A | 8/2005 |
| JP | 2008177950 A | 7/2008 |
| JP | 2008532687 A | 8/2008 |
| JP | 2010067001 A | 3/2010 |
| JP | 2013125356 A | 6/2013 |

OTHER PUBLICATIONS

Office Action for corresponding JP Patent Application No. 2013221393, dated Aug. 18, 2015.
Office Action for corresponding JP Patent Application No. 2013221393, pp. 13, dated Jul. 19, 2016.
Office Action for corresponding CN Patent Application No. 201410553053.6, pp. 15, dated Dec. 20, 2016.

* cited by examiner

CAPTURE EXECUTION/NON-EXECUTION CONTROL DEVICE, CAPTURE EXECUTION/NON-EXECUTION CONTROL METHOD, PROGRAM, AND INFORMATION STORAGE MEDIUM

BACKGROUND

The present disclosure relates to a capture execution/non-execution control device, a capture execution/non-execution control method, a program, and an information storage medium.

There are techniques to capture and store an image generated and displayed on a display unit through execution of a program such as a game program (refer to e.g. U.S. Patent Application Publication No. 2009/0118008 and U.S. Pat. No. 8,417,097). Furthermore, there is a technique in which a notification of permission or prohibition of capture of a displayed image is acquired from the program and whether or not to execute capture of the image is controlled according to the acquisition of this notification. As one example of such a technique, there is a technique to control whether or not capture of a play image of a game is permitted according to the scene of this game and so forth in order to protect the copyright or prevent how the game progresses from being opened to the public for example.

SUMMARY

In the related arts, the notification acquired from the program merely indicates that capture of an image is permitted or prohibited. Therefore, to realize complicated control as to whether or not capture of an image is permitted, such as control according to the execution timing of this program, values of attributes of a user, and so forth, a complicated logic needs to be implemented in this program, leading to a lot of labor of the implementation.

There is a need for the present disclosure to provide a capture execution/non-execution control device, a capture execution/non-execution control method, a program, and an information storage medium that can realize complicated control as to whether or not capture of a displayed image is permitted more easily than related arts.

According to an embodiment of the present disclosure, there is provided a capture execution/non-execution control device including a display controller configured to carry out control to cause an image generated through execution of a program to be displayed on a display unit, and a capture level value acquirer configured to acquire a capture level value indicating the degree of permission or prohibition of capture of an image displayed on the display unit. The capture execution/non-execution control device further includes a reference value acquirer configured to acquire a reference value serving as a criterion as to whether or not capture of an image is permitted, and a capture execution/non-execution controller configured to control whether or not to execute capture of the image displayed on the display unit according to a result of comparison between the capture level value acquired and the reference value acquired.

According to another embodiment of the present disclosure, there is provided a capture execution/non-execution control method including carrying out control to cause an image generated through execution of a program to be displayed on a display unit, and acquiring a capture level value indicating the degree of permission or prohibition of capture of an image displayed on the display unit. The capture execution/non-execution control method further includes acquiring a reference value serving as a criterion as to whether or not capture of an image is permitted, and controlling whether or not to execute capture of the image displayed on the display unit according to a result of comparison between the capture level value acquired and the reference value acquired.

According to another embodiment of the present disclosure, there is provided a program for a computer, including carrying out control to cause an image generated through execution of a program to be displayed on a display unit, and acquiring a capture level value indicating the degree of permission or prohibition of capture of an image displayed on the display unit. The method further includes acquiring a reference value serving as a criterion as to whether or not capture of an image is permitted, and controlling whether or not to execute capture of the image displayed on the display unit according to a result of comparison between the capture level value acquired and the reference value acquired.

According to another embodiment of the present disclosure, there is provided a computer-readable information storage medium in which a program is stored. The program for a computer includes carrying out control to cause an image generated through execution of a program to be displayed on a display unit, and acquiring a capture level value indicating the degree of permission or prohibition of capture of an image displayed on the display unit. The method further includes acquiring a reference value serving as a criterion as to whether or not capture of an image is permitted, and controlling whether or not to execute capture of the image displayed on the display unit according to a result of comparison between the capture level value acquired and the reference value acquired.

According to the embodiments of the present disclosure, whether or not to execute capture of the image displayed on the display unit is controlled based on the result of comparison between the capture level value and the reference value. Thus, complicated control as to whether or not capture of the displayed image is permitted can be realized more easily than related arts.

In the embodiment of the present disclosure, the capture execution/non-execution controller controls whether or not to execute capture of the image displayed on the display unit according to a magnitude relationship between the capture level value acquired and the reference value acquired.

Further, in the embodiment of the present disclosure, the capture execution/non-execution control device further includes a capture permission/prohibition determiner configured to determine whether or not capture of the image displayed on the display unit is permitted according to the result of comparison between the capture level value acquired and the reference value acquired when capture start operation from a user is accepted, and the capture execution/non-execution controller starts capture of the image displayed on the display unit if it is determined that capture of the image is permitted.

In the embodiment of the present disclosure, the capture permission/prohibition determiner determines whether or not capture of the image displayed on the display unit is permitted according to the result of comparison between the capture level value acquired and the reference value acquired when capture start operation is accepted and, if capture of the image is prohibited, the capture execution/non-execution controller starts capture of the image displayed on the display unit when a situation in which capture of the image is permitted begins.

Further, in the embodiment of the present disclosure, when the capture level value that is set is changed, the capture level value acquirer acquires the capture level value after the change, and the capture execution/non-execution controller carries out control to cause a capture image of an image displayed before the change in the capture level value and a capture image of an image displayed after the change in the capture level value to be managed in association with chapters different from each other.

Even further, in the embodiment of the present disclosure, the reference value acquirer acquires the reference value according to execution timing of the program.

Still further, in the embodiment of the present disclosure, the reference value acquirer acquires the reference value according to a value of an attribute of a user.

Further, in the embodiment of the present disclosure, the program is a program of a game, and the capture level value is a value according to a scene in the game.

DETAILED DESCRIPTION OF THE PREFERRED EMBODIMENT

One embodiment of the present disclosure will be described in detail below based on the drawings.

Figure 1:
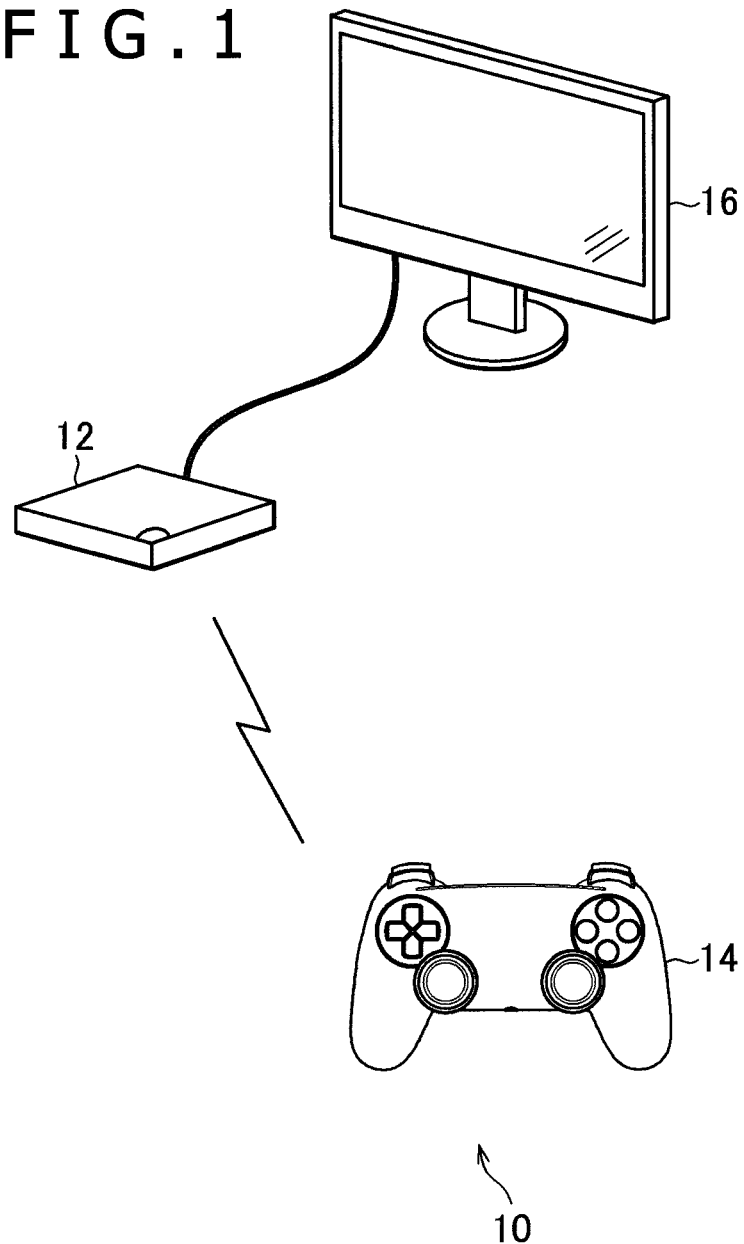
FIG. 1 is a diagram showing one example of the overall configuration of an information processing system according to one embodiment of the present disclosure.

FIG. 1 is a diagram showing one example of the overall configuration of an information processing system 10 according to one embodiment of the present disclosure. As shown in FIG. 1, the information processing system 10 according to the present embodiment includes an information processing device 12, a controller 14, and a display 16.

Figure 2:
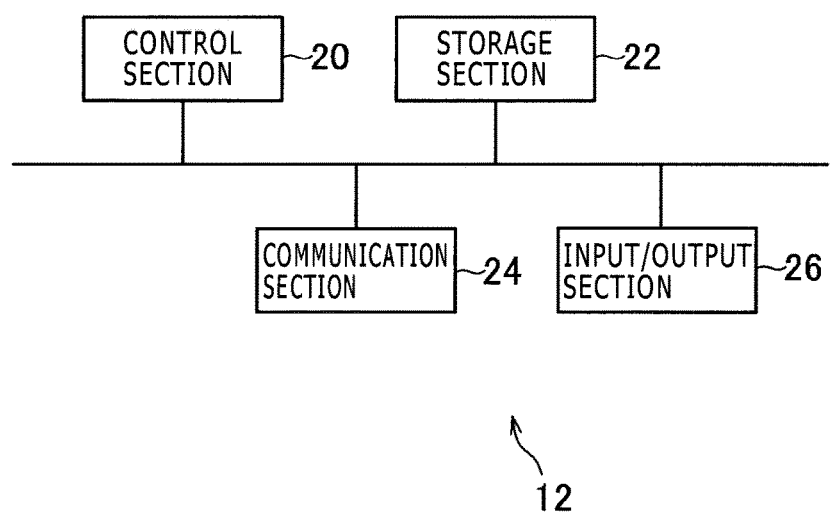
FIG. 2 is a diagram showing one example of the hardware configuration of an information processing device of one embodiment of the present disclosure.

The information processing device 12 according to the present embodiment is e.g. a computer such as a game device or a personal computer and includes a control section 20, a storage section 22, a communication section 24, and an input/output section 26 as shown in FIG. 2 for example. The control section 20 is e.g. a program-controlled device such as a central processing unit (CPU) that operates in accordance with programs installed in the information processing device 12. In the control section 20 according to the present embodiment, a graphics processing unit (GPU) that draws images into a frame buffer based on graphics commands and data supplied from the CPU is also included. The storage section 22 is e.g. storage elements such as a read-only memory (ROM) and a random-access memory (RAM) and a hard disc drive. In the storage section 22, programs executed by the control section 20 and so forth are stored. Furthermore, in the storage section 22 according to the present embodiment, the area of the frame buffer into which images are drawn by the GPU is ensured. The communication section 24 is e.g. a communication interface such as a network board and a wireless local area network (LAN) module. The input/output section 26 is input/output ports such as high-definition multimedia interface (HDMI, registered trademark) ports and universal serial bus (USB) ports. In the present embodiment, image and audio data generated by the control section 20 are output to the display 16 via the input/output section 26 for example.

The controller 14 according to the present embodiment is an operation input device for making operation input to the information processing device 12. The controller 14 according to the present embodiment includes e.g. a USB port and a wireless LAN module. The controller 14 according to the present embodiment can communicate with the information processing device 12 in a wired manner via the USB ports of the controller 14 and the information processing device 12 or wirelessly via the wireless LAN modules of the controller 14 and the information processing device 12 for example.

The display 16 according to the present embodiment is a liquid crystal display, an organic electroluminescence (EL) display, or the like. In the present embodiment, the information processing device 12 and the display 16 are connected by e.g. an HDMI cable. The display 16 according to the present embodiment includes a built-in speaker. The display 16 according to the present embodiment displays images represented by a video signal accepted via the input/output section 26 and outputs sounds represented by audio data accepted via the input/output section 26.

In the present embodiment, the program installed in the information processing device 12 is executed in this information processing device 12. Hereinafter, this program will be referred to as a target program. Furthermore, suppose that the target program according to the present embodiment is e.g. a game program, specifically a game program of a shooting game. The information processing device 12 according to the present embodiment executes the target program and thereby images are generated at a predetermined frame rate (e.g. every 1/60 seconds) according to the progression status of this target program. In the present embodiment, images are generated according to the progression status of the shooting game for example.

Figure 3A:
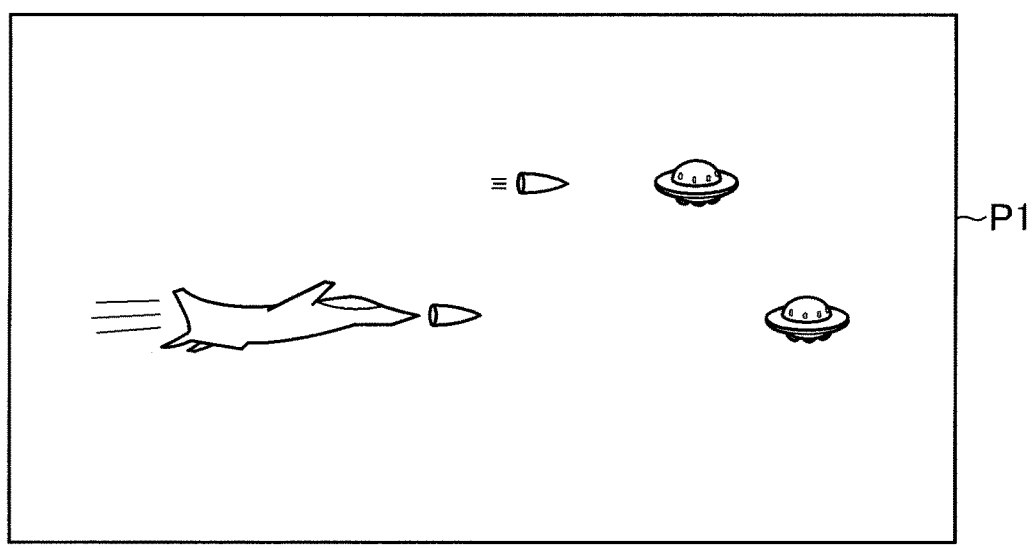
FIG. 3A is a diagram showing one example of a play image.
Figure 3B:
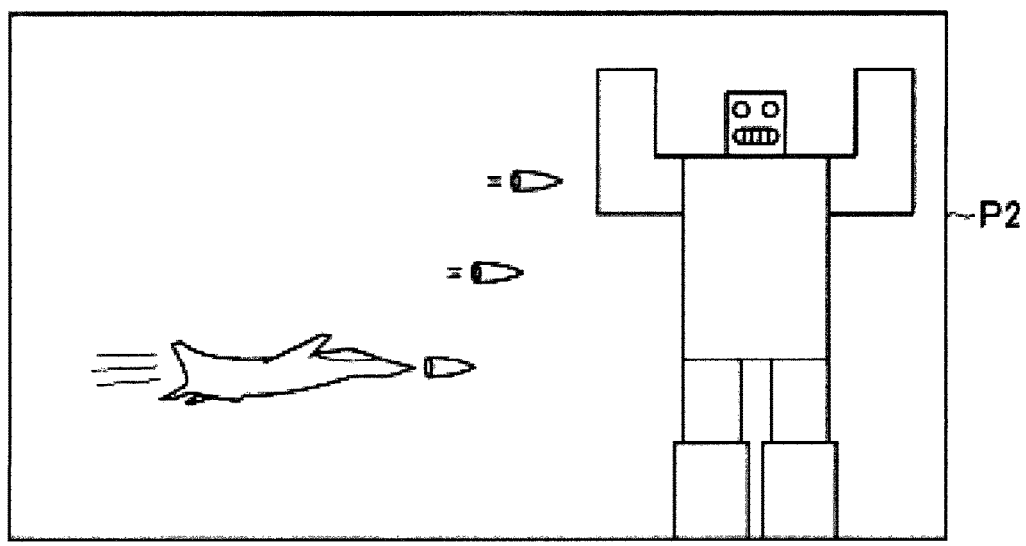
FIG. 3B is a diagram showing one example of the play image.

In FIGS. 3A and 3B, play images P generated when the program of the shooting game is executed as one example of the images generated in the above-described manner are shown. The shooting game according to the present embodiment is composed of plural stages. In FIG. 3A, a play image P1 representing one scene from the early phase to the middle phase of a certain stage is shown. In FIG. 3B, a play image P2 representing one scene in the final phase of this stage, specifically e.g. a scene of a boss fight, is shown.

In the present embodiment, in the information processing device 12, a capture execution/non-execution control program for controlling whether or not to execute capture of a series of play images P about a specific scene is installed besides the above-described target program. The information processing device 12 according to the present embodiment executes the capture execution/non-execution control program and thereby whether or not to execute capture of the series of play images P about the specific scene is controlled. Here, for example whether or not to record this series of play images P as a moving image after encoding thereof, i.e. whether or not to store them in the storage section 22, is controlled. The frame rate when the series of play images P are displayed on the display 16 may be the same as, or different from, the frame rate of the moving image stored in the storage section 22. In the present embodiment, the play images P controlled to be captured are stores as frame images configuring a moving image in a ring buffer area that is set in the storage section 22 and can store a moving image of up to 15 minutes. Hereinafter, this moving image will be referred to as a play moving image. Furthermore, in the present embodiment, audio data representing sounds output together with a play moving image from the built-in speaker in the display 16 is stored in the ring buffer area in association with frame images configuring this play moving image. The user of the information processing device 12 is allowed to freely reproduce a recorded play moving image by executing a moving image reproduction program installed in the information processing device 12.

In the present embodiment, the user of the information processing device 12, here e.g. the player of the shooting game, is allowed to freely edit a play moving image stored in the ring buffer area by a moving image edit program installed in the information processing device 12. In this manner, in the present embodiment, the user of the information processing device 12 is allowed to create a moving image that includes the play images P as the frame images and is desired to be opened to the public. Furthermore, in the present embodiment, the moving image created in this manner is allowed to be uploaded to various kinds of sites on the Internet, such as a moving image posting site. The moving image uploaded in this manner is opened to the public.

Figure 4:
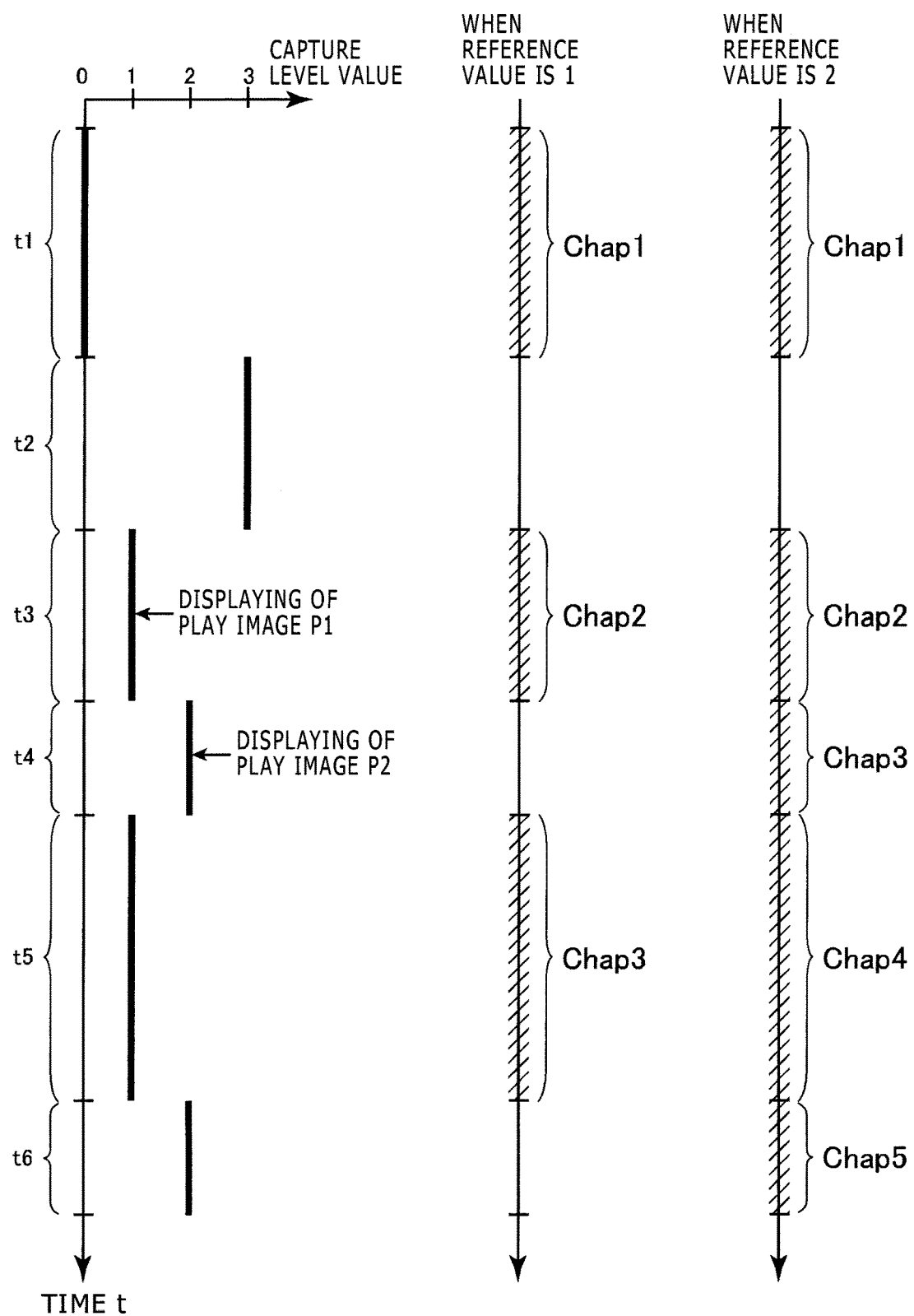
FIG. 4 is a diagram showing one example of capture execution/non-execution control of the play image.

The capture execution/non-execution control of the play image P in the present embodiment will be further described below. FIG. 4 is an explanatory diagram for explaining one example of the capture execution/non-execution control of the play image P in the present embodiment. In the present embodiment, whether or not to capture the play image P, i.e. whether or not to generate a capture image of the play image P, is controlled based on a capture level value and a reference value as shown in FIG. 4.

In the present embodiment, the capture level value refers to a value indicating the degree of permission or prohibition of capture of the play image P displayed on the display 16 about each scene in the shooting game for example. In the present embodiment, any of integer values from 0 to 3 inclusive is set as the capture level value for example. Furthermore, in the present embodiment, a larger value is set as the capture level value when the degree of prohibition of capture of the play image P is higher and a smaller value is set as the capture level value when the degree of permission of capture of the play image P is higher. In the present embodiment, at timing when the capture level value is changed, specifically e.g. at timing when the scene shown in the play image P changes in the present embodiment, the target program notifies the capture level value after the change to the capture execution/non-execution control program. Then, the capture execution/non-execution control program acquires this capture level value after the change from the target program. In the present embodiment, the capture level value is so set as to be associated with the target program by the creator of the program and cannot be changed. The capture level value may be changeable by the creator of the target program and so forth.

In the present embodiment, the reference value refers to a value that is set separately from the capture level value and serves as the criterion as to whether or not capture of an image is permitted for example. In the present embodiment, the reference value is set according to values of various kinds of parameters, such as the execution timing of the target program and values of attributes of the user of the information processing device 12 (e.g. values indicating the address, age, gender, etc. of the user). For example, a value according to whether or not the present period is a promotion period of the target program may be set as the reference value. Specifically, for example, 2 may be set as the reference value about a predefined promotion period of the target program whereas 1 may be set as the reference value about the other period. Furthermore, the reference value according to the elapsed time from the release date of the target program may be set for example. Specifically, for example, 2 may be set as the reference value if six months or longer have elapsed from the release date of the target program whereas 1 may be set as the reference value if six months have not elapsed. Moreover, for example, 2 may be set as the reference value if the address of the user is in a specific region whereas another value, e.g. the reference value according to values of attributes of the user of the information processing device 12, such as the address, age, gender, etc. of the user, may be set if not so.

In the present embodiment, a logic to decide the reference value based on the above-described values of various kinds of parameters is implemented in the target program. Furthermore, in the present embodiment, the reference value decided based on the above-described values of various kinds of parameters is notified to the capture execution/non-execution control program at the time of the start of execution this target program. Then, the capture execution/non-execution control program acquires this reference value from the target program. In this manner, the capture execution/non-execution control program according to the present embodiment acquires, from the target program, the capture level value and the reference value independently of each other. When the above-described values of various kinds of parameters change, the reference value decided based on the values of the parameters after the change may be notified from the target program to the capture execution/non-execution control program. In the present embodiment, the user of the information processing device 12 is not allowed to change the reference value.

In the present embodiment, the capture level value and the reference value are compared. If the capture level value is equal to or smaller than the reference value, capture of the play images P is permitted. In the present embodiment, during the period in which capture of the play images P is permitted, capture images of these play images P are recorded as frame images configuring a moving image. In the period in which capture of the play images P is permitted, capture images of the play images P may be recorded in response to a request from the user.

In FIG. 4, whether or not capture images of the play images P are recorded in each of periods t1 to t6 is schematically shown about when 1 is set as the reference value and when 2 is set. In the present embodiment, the play image P1 representing a scene from the early phase to the middle phase of a stage is displayed in the period t3. The capture level value of this scene is 1. Furthermore, in the present embodiment, the play image P2 representing a scene in the final phase of the stage is displayed in the period t4. The capture level value of this scene is 2. The capture level values of scenes represented by the play images P displayed in the other periods t1, t2, t5, and t6 are 0, 3, 1, and 2, respectively.

In the present embodiment, the play images P of scenes whose capture level value is 0 or 1, displayed in the periods t1, t3, and t5, are captured both when the reference value is 1 and when it is 2. The play images P whose capture level value is 2, displayed in the periods t4 and t6, are not captured when the reference value is 1, but captured when it is 2. The play images P of a scene whose capture level value is 3, displayed in the period t2, are captured neither when the reference value is 1 nor when it is 2.

For example, the creator of the target program may create the target program in such a manner that, for a scene about which recording of a play moving image is more unwanted or a scene about which opening to the public is more unwanted, a larger value is set as the capture level value of this scene. For example, suppose that the creator of the target program thinks that recording of a play moving image of a scene is more unwanted or opening to the public is more unwanted about a scene in the final phase of a stage than about a scene from the early phase to the middle phase of the stage. In such a case, for example as shown in FIG. 4, e.g. 1 is set as the capture level value about the scene from the early phase to the middle phase and e.g. 2 is set about the scene in the final phase of the stage. By employing this, the play images P of scenes whose capture level value is 2 or larger are kept from being captured when 1 is set as the reference value.

For example, a situation will be possible in which capture is desired to be permitted only when a specific condition is satisfied about a certain scene. Specifically, for example, a case will be possible in which recording and opening to the public are desired to be permitted only in a predetermined promotion period about a play moving image representing a scene in the final phase of a stage. In such a case, for example the setting is so made that 2 is notified as the reference value from the target program to the capture execution/non-execution control program only during this promotion period. This causes capture of the play images P of scenes whose capture level value is 2. Furthermore, by making 2 be notified as the reference value after the elapse of a predetermined period from the release date of the target program, recording and opening to the public about a play moving image representing the relevant scene can be enabled upon the elapse of the predetermined period from the release date of the target program. In the above-described manner, whether or not capture of the displayed play image P is permitted can be changed in an ex-post manner in the present embodiment. Furthermore, in the present embodiment, complicated control as to whether or not capture of a displayed image is permitted can be realized more easily than related arts.

Moreover, in the present embodiment, a chapter is delimited at timing when the capture level value is changed, e.g. at timing when the scene shown in the play image P changes in the present embodiment. FIG. 4 shows that play moving images of three chapters, Chaps 1 to 3, are recorded when the reference value is 1 and play moving images of five chapters, Chaps 1 to 5, are recorded when the reference value is 2. A chapter may be delimited at timing when the reference value is changed in execution of the target program.

A further description will be made below about the functions of the information processing device 12 relating to the capture execution/non-execution control of the play image P and capture execution/non-execution control processing of the play image P executed in the information processing device 12.

Figure 5:
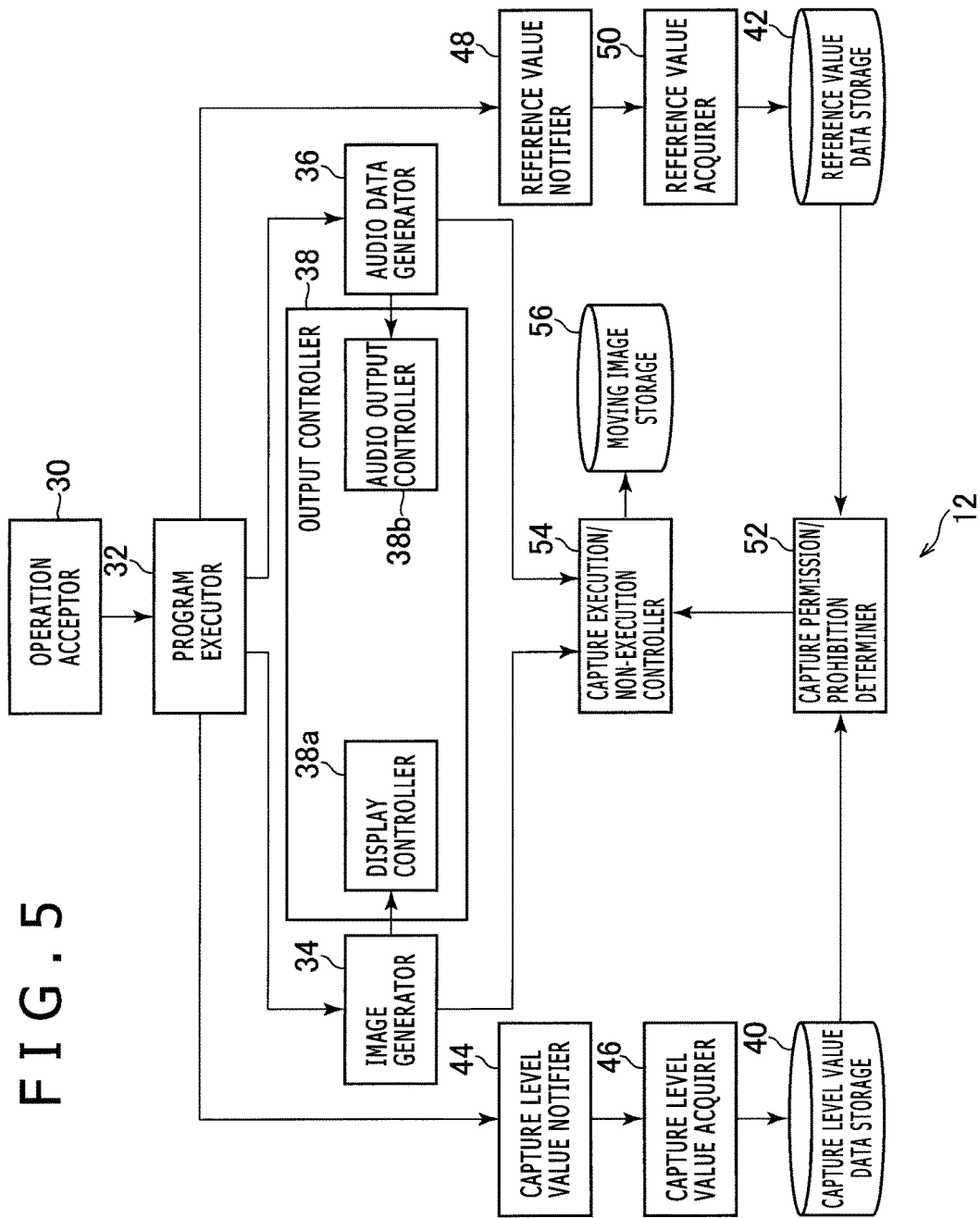
FIG. 5 is a functional block diagram showing one example of functions implemented in the information processing device according to one embodiment of the present disclosure.

FIG. 5 is a functional block diagram showing one example of functions implemented in the information processing device 12 according to the present embodiment. In the information processing device 12 according to the present embodiment, all of the functions shown in FIG. 5 do not need to be implemented and a function other than the functions shown in FIG. 5 may be implemented.

As shown in FIG. 5, the information processing device 12 according to the present embodiment functionally includes e.g. an operation acceptor 30, a target program executor 32, an image generator 34, an audio data generator 36, an output controller 38, a capture level value data storage 40, a reference value data storage 42, a capture level value notifier 44, a capture level value acquirer 46, a reference value notifier 48, a reference value acquirer 50, a capture permission/prohibition determiner 52, a capture execution/non-execution controller 54, and a moving image storage 56. The output controller 38 includes a display controller 38a and an audio output controller 38b. The operation acceptor 30, the target program executor 32, the capture level value notifier 44, and the reference value notifier 48 are associated with the above-described target program. The operation acceptor 30, the image generator 34, the audio data generator 36, the output controller 38, the capture level value data storage 40, the reference value data storage 42, the capture level value acquirer 46, the reference value acquirer 50, the capture permission/prohibition determiner 52, the capture execution/non-execution controller 54, and the moving image storage 56 are associated with the above-described capture execution/non-execution control program. The capture level value data storage 40, the reference value data storage 42, and the moving image storage 56 are implemented based mainly on the storage section 22. The operation acceptor 30 is implemented based mainly on the communication section 24 and the input/output section 26. The output controller 38 is implemented based mainly on the control section 20 and the input/output section 26. The other functions are implemented based mainly on the control section 20. In the above-described manner, the information processing device 12 according to the present embodiment plays a role as the capture execution/non-execution control device.

The above functions are implemented through execution of a program that is installed in the information processing device 12 as a computer and includes commands corresponding to the above functions in the control section of the information processing device 12. This program is supplied to the information processing device 12 via a computer-readable information storage medium such as optical disc, magnetic disc, magnetic tape, magneto-optical disc, or flash memory or via a computer network such as the Internet.

The operation acceptor 30 accepts, from the controller 14, an operation signal according to operation to the controller 14 by the user.

The target program executor 32 executes the target program. Furthermore, in the present embodiment, the target program executor 32 executes processing according to the operation signal accepted by the operation acceptor 30.

The image generator 34 generates images according to the status of execution of the target program by the target program executor 32.

The audio data generator 36 generates audio data according to the status of execution of the target program by the target program executor 32.

The output controller 38 controls output to the display 16. The display controller 38a carries out control to cause the images generated by the image generator 34 to be displayed on the display 16. In the present embodiment, the display controller 38a outputs the images generated by the image generator 34 to the display 16 for example. The audio output controller 38b carries out control to cause the audio data generated by the audio data generator 36 to be output from the built-in speaker in the display 16. In the present embodiment, the audio output controller 38b outputs the audio data generated by the audio data generator 36 to the display 16 for example.

The capture level value data storage 40 stores capture level value data indicating the above-described capture level value.

The reference value data storage 42 stores reference value data indicating the above-described reference value.

The capture level value notifier 44 notifies the capture level value to the capture level value acquirer 46. In the present embodiment, when the capture level value associated with the scene represented by the displayed image changes, the capture level value notifier 44 notifies the capture level value after the change to the capture level value acquirer 46. Specifically, for example, at timing when a boss fight is started after a stage of a shooting game enters the latter half, the capture level value notifier 44 notifies 2 to the capture level value acquirer 46 as the value of the capture level value data.

The capture level value acquirer 46 acquires the capture level value notified by the capture level value notifier 44. Then, the capture level value acquirer 46 sets this capture level value as the value of the capture level value data stored in the capture level value data storage 40. If the value of the capture level value data stored in the capture level value data storage 40 has been already set, the capture level value acquirer 46 changes this already-set value to the acquired capture level value.

The reference value notifier 48 notifies the reference value acquirer 50 of the reference value decided according to e.g. the execution timing of the target program and values of attributes of the user.

The reference value acquirer 50 acquires the reference value notified by the reference value notifier 48. Then, the reference value acquirer 50 sets this reference value as the value of the reference value data stored in the reference value data storage 42. If the value of the reference value data stored in the reference value data storage 42 has been already set, the reference value acquirer 50 changes this already-set value to the acquired reference value.

A value according to the combination of the execution timing of the target program and values of attributes of the user may be set as the value of the relevant reference value data. For example, a code to decide the reference value based on values of parameters, such as a value indicating the timing when the target program is executed (e.g. present date and time) and values of attributes of the user, may be hard-coded into the target program. Furthermore, a return value of this code may be set as the value of the reference value data.

Alternatively, for example, a program to decide the reference value based on values of parameters, such as a value indicating the timing when the target program is executed (e.g. present date and time) and values of attributes of the user, may be installed in a server connected via the Internet or the like. Furthermore, at predetermined timing, e.g. at the start of execution of the target program, the target program executor 32 may transmit values of parameters to this server and acquire a value returned from this server. Then, the reference value notifier 48 may notify this value to the reference value acquirer 50. Then, the reference value acquirer 50 may set this value as the value of the reference value data stored in the reference value data storage 42.

This program to decide the reference value based on values of parameters may be stored in the storage section 22. Furthermore, for example, at predetermined timing, e.g. at the start of execution of the target program, the target program executor 32 may execute this program and acquire a return value of this program. Then, the reference value notifier 48 may notify this return value to the reference value acquirer 50. Then, the reference value acquirer 50 may set this return value as the value of the reference value data stored in the reference value data storage 42.

The capture permission/prohibition determiner 52 determines whether or not capture of the image displayed on the display 16 is permitted based on the result of comparison between the capture level value acquired by the capture level value acquirer 46 and the reference value acquired by the reference value acquirer 50. For example, whether or not capture of the image is permitted is determined based on the magnitude relationship between the value of the capture level value data stored in the capture level value data storage 40 and the value of the reference value data stored in the reference value data storage 42. In the present embodiment, for example, if the capture level value acquired by the capture level value acquirer 46 is equal to or smaller than the reference value acquired by the reference value acquirer 50, the capture permission/prohibition determiner 52 determines to capture the image displayed on the display 16.

The capture execution/non-execution controller 54 controls whether or not to execute capture of the image displayed on the display 16 according to the determination result by the capture permission/prohibition determiner 52. Furthermore, in the present embodiment, if the capture permission/prohibition determiner 52 determines to capture the image displayed on the display 16, the capture execution/non-execution controller 54 generates a capture image of the image drawn in the frame buffer.

In the present embodiment, the capture permission/prohibition determiner 52 determines whether or not capture of the image is permitted when the value of the capture level value data stored in the capture level value data storage 40 or the value of the reference value data stored in the reference value data storage 42 is changed. The capture execution/non-execution controller 54 starts capture of the image displayed on the display 16 if it is determined that capture of this image is permitted when capture of the image displayed on the display 16 is not being executed. Furthermore, the capture execution/non-execution controller 54 ends capture of the image displayed on the display 16 if it is determined that capture of this image is prohibited when capture of the image displayed on the display 16 is being executed.

The capture permission/prohibition determiner 52 may determine whether or not capture of the image displayed on the display 16 is permitted when the operation acceptor 30 accepts predetermined capture start operation such as pressing of a predetermined button. Then, the capture execution/non-execution controller 54 may start capture of the image displayed on the display 16 if it is determined that capture of this image is permitted.

Furthermore, for example, if it is determined that capture of the image is prohibited when capture start operation is accepted, thereafter the capture permission/prohibition determiner 52 may determine whether or not capture of the image is permitted every time the capture level value acquirer 46 acquires the capture level value. Then, the capture execution/non-execution controller 54 may start capture of the image displayed on the display 16 when it is determined that capture of this image is permitted.

In the present embodiment, the capture execution/non-execution controller 54 makes the moving image storage 56 store the capture images generated in this manner as frame images configuring a moving image. Furthermore, in the present embodiment, the capture execution/non-execution controller 54 associates these frame images with audio data representing sounds output from the display 16 together with these images and stores them in the moving image storage 56.

In the present embodiment, when the capture level value or the reference value is changed, the capture execution/non-execution controller 54 makes a moving image formed of capture images after the change be stored in association with a chapter different from that of a moving image formed of capture images before the change. In this manner, in the present embodiment, as shown in FIG. 4, a moving image stored before change in the capture level value or the reference value and a moving image stored after the change are so managed as to be associated with chapters different from each other. The capture execution/non-execution controller 54 may store a moving image in the moving image storage 56 in association with a chapter title accepted from the user.

The moving image storage 56 stores the above-described capture images as frame images configuring a moving image. The moving image storage 56 is a ring buffer in the present embodiment and can store a moving image of up to 15 minutes. In the present embodiment, the moving image storage 56 stores the capture image of the image displayed on the display 16 in association with audio data representing sounds output from the display 16 together with this displayed image.

Figure 6:
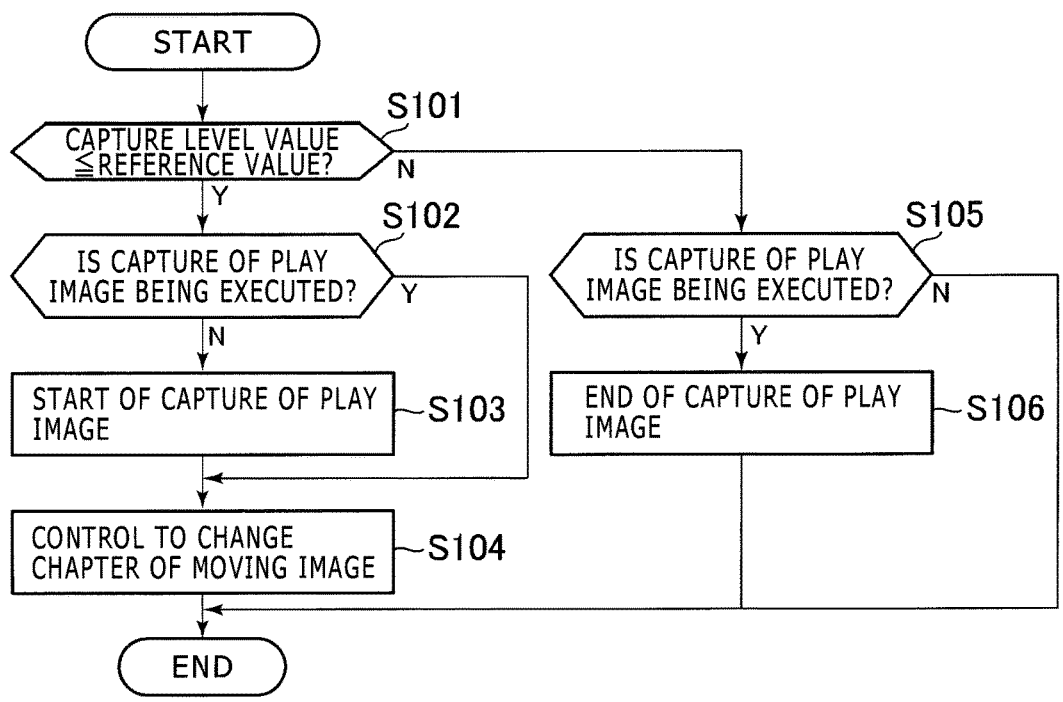
FIG. 6 is a flow diagram showing one example of the flow of processing executed in the information processing device according to one embodiment of the present disclosure.

With reference to a flow diagram shown in FIG. 6, a description will be made below about one example of the flow of processing executed in the information processing device 12 according to the present embodiment when the value of the capture level value data stored in the capture level value data storage 40 is changed.

First, the capture permission/prohibition determiner 52 determines whether or not the value of the capture level value data stored in the capture level value data storage 40 is equal to or smaller than the value of the reference value data stored in the reference value data storage 42 (S101). If it is determined that the value of the capture level value data is equal to or smaller than the value of the reference value data (S101: Y), the capture execution/non-execution controller 54 checks whether or not the present status is the status in which capture of the play image P, specifically e.g. storing of the play image P in the moving image storage 56, is being executed (S102). If the present status is not the status in which capture of the play image P is being executed (S102: N), the capture execution/non-execution controller 54 starts capture of the play image P (S103). After this start, capture images of the play images P output to the display 16 are stored in the moving image storage 56 in association with audio data representing sounds output from the display 16 together with these play images P.

If the present status is the status in which capture of the play image P is being executed (S102: Y) or if the processing shown in S103 ends, the capture execution/non-execution controller 54 carries out control to change the chapter of a moving image to be stored (S104) and ends the processing shown in the present processing example. Specifically, for example, control is carried out so that a moving image to be stored after the start of capture may be stored in the moving image storage 56 in such a state as to be associated with the title of a new chapter. This title can be specified by the user when the chapter is changed for example. In this manner, in the present embodiment, when the capture level value is changed, the moving image stored before the change and the moving image stored after the change are so managed as to be associated with chapters different from each other.

If it is determined that the value of the capture level value data is not equal to or smaller than the value of the reference value data stored in the reference value data storage 42 in the processing shown in S101 (S101: N), the capture execution/non-execution controller 54 checks whether or not the present status is the status in which capture of the play image P, specifically e.g. storing in the moving image storage 56, is being executed (S105). If the present status is the status in which capture of the play image P is being executed (S105: Y), the capture execution/non-execution controller 54 ends capture of the play image P (S106) and ends the processing shown in the present processing example.

The present disclosure is not limited to the above-described embodiment.

For example, in the above-described embodiment, at timing when the capture level value is changed, the target program notifies the capture level value after the change to the capture execution/non-execution control program. However, irrespective of whether or not the capture level value is changed, e.g. at timing when the scene shown in the play image P changes, the target program may notify the capture level value of the scene after the change to the capture execution/non-execution control program.

For example, suppose that the target program is a program of a game and this game is composed of plural mini-games about which order of execution is decided depending on the progression status of the game. In addition, suppose that the capture level value is associated with each mini-game. In this case, at timing when play of a new mini-game is started, the capture level value of the started mini-game may be notified to the capture execution/non-execution control program. Depending on the order of execution of the mini-game, possibly the capture level value is not changed even when play of a new mini-game is started.

In the above cases, the capture execution/non-execution control program may control whether or not to execute capture of an image according to the result of comparison between the capture level value and the reference value when acquiring the capture level value notified from the target program. If this is employed, it is enough for the target program to notify the capture level value when the scene of a game changes or when play of a new mini-game is started, and the processing of checking whether or not the capture level value is changed does not need to be executed.

Irrespective of whether or not the capture level value is changed, a moving image stored before notification of the capture level value by the target program and a moving image stored after the notification may be so stored as to be associated with chapters different from each other. If this is employed, irrespective of whether or not the capture level value is changed, the chapter of a moving image to be stored is changed when the scene of a game changes or when a new mini-game is started.

For example, the method of comparison between the capture level value and the reference value is not limited to the above-described method. For example, the reference value may indicate the capture level value with which capture of the play image P is permitted or prohibited. Specifically, for example, if the reference value is 2, capture of the play image P may be permitted when the capture level value is 2 and capture of the play image P may be prohibited when it is other than 2. Conversely, if the reference value is 2, capture of the play image P may be prohibited when the capture level value is 2 and capture of the play image P may be permitted when it is other than 2.

For example, when the operation acceptor 30 accepts predetermined operation such as pressing of a predetermined button, information indicating that the capture operation is accepted may be displayed on the display 16. Furthermore, for example, when capture of the play image P is started, information indicating this may be displayed on the display 16.

For example, when the operation acceptor 30 accepts predetermined operation such as pressing of a predetermined button, a moving image stored in the ring buffer may be copied into an area in the storage section 22 assigned to the user of the information processing device 12. The user of the information processing device 12 may be allowed to carry out reproduction, edit, and upload of the moving image copied into this area. Whether or not to copy a moving image into the area in the storage section 22 assigned to the user of the information processing device 12 may be controlled according to the result of comparison between the reference value and the capture level value in the above-described manner.

For example, the reference value and the capture level value of a recorded image may be compared when the recorded image is uploaded to a moving image posting site or the like to be opened to the public. Furthermore, control may be so carried out that the upload is permitted if the capture level value of the recorded image is equal to or smaller than the reference value at the timing of this opening and the upload is not permitted if not so. If this is employed, for example when an image is opened to the public after the elapse of appropriate time, e.g. after one month, from the timing of the recording thereof, control as to whether or not opening of the image to the public is permitted based on the reference value at the timing of this opening is enabled.

For example, separately from the capture level value, an opening level value indicating the degree of permission or prohibition of posting of an image to a moving image posting site or the like and opening thereof to the public may be settable. Also regarding the reference value, a capture reference value serving as the criterion as to whether or not capture of an image is permitted and an opening reference value serving as the criterion as to whether or not opening of an image to the public is permitted may be allowed to be separately set. Whether or not to generate a capture image may be controlled based on the result of comparison between the capture level value and the capture reference value. In addition, whether or not to upload a capture image to a moving image posting site or the like and open it to the public may be controlled based on the result of comparison between the opening level value and the opening reference value. Furthermore, the reference value may be decided according to the site to which an image is uploaded for example.

For example, capture level values different for the image and the sound may be settable. In addition, for example, reference values different for the image and the sound may be settable. Whether or not to capture an image may be controlled based on the result of comparison between the capture level value and the reference value about the image. Furthermore, whether or not to record a sound may be controlled based on the result of comparison between the capture level value and the reference value about the sound. In this case, instead of control to prohibit recording of a sound, control may be so carried out that a sound is recorded in the state in which filtering processing is executed for the sound, i.e. in the state in which the sound is altered, for example.

For example, whether or not capture of an image is permitted may be controlled through control of whether the play image P is captured as a capture image as it is or a blurred image of this play image P is captured based on the result of comparison between the capture level value and the reference value about the image. This blurred image can be generated by executing filtering processing such as smoothing processing for this play image P for example. The intensity of blurring may be decided based on the result of comparison between the capture level value and the reference value about the image for example. Furthermore, control may be so carried out that a blurred image with the decided intensity is captured. For example, the intensity of blurring may be low when the capture level value is larger than the reference value and the difference therebetween is 1, and the intensity of blurring may be higher when the difference is 2. As the difference becomes larger, the intensity of blurring may become higher. In addition, capture level value and reference value for controlling whether or not to capture the play image P as it is and capture level value and reference value for controlling whether or not to capture a blurred image of the play image P may be settable independently of each other.

The present embodiment may be applied to live streaming distribution. Specifically, for example, suppose a situation in which the play images P are displayed on the display 16 and capture images of these play images P are uploaded to a site that offers live streaming services and opened to the public. In this case, whether or not to execute streaming of the capture images may be controlled based on the result of comparison between the capture level value and the reference value for example. For example, during the period when control to prohibit streaming is carried out, a still image in which information indicating that streaming cannot be executed is described may be distributed by streaming. Instead of this still image, blurred images of the play images P may be distributed by streaming.

For example, the above-described capture level value and reference value for controlling whether or not image recording is permitted, the above-described capture level value and reference value for controlling whether or not sound recording is permitted, and the above-described capture level value and reference value for controlling whether or not streaming distribution is permitted may be settable independently of each other. In this case, for example, a state may be made in which, although sounds are distributed as they are, the play images P are not distributed but instead a still image in which information indicating that streaming cannot be executed is described is distributed. Alternatively, a state may be made in which sounds are distributed as they are but blurred images are distributed about the play images P. As described above, according to the present embodiment, the effect about capture of the play image P can be adjusted by using the capture level value, the reference value, and a predetermined decision rule.

The information processing device 12 may include the display 16 as a built-in unit. The information processing device 12 may be formed of plural chassis. The above specific character strings and the specific character strings in the drawings are examples and embodiments of the present disclosure are not limited to these character strings.

The present disclosure contains subject matter related to that disclosed in Japanese Priority Patent Application JP 2013-221393 filed in the Japan Patent Office on Oct. 24, 2013, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A capture execution/non-execution control device comprising:
   a display controller configured to carry out control to cause a plurality of images generated through execution of a program to be displayed on a display unit;
   a capture level value acquirer configured to acquire respective capture level values from the program indicating respective degrees of permission or prohibition of capturing the respective ones of the images, wherein the capture level values are numeric magnitudes that are set by a programmer of the program and vary for respective ones of the images between one numerical extreme indicating a high permission to capture a given one of the plurality of images and another numerical extreme indicating a prohibition to capture a given one of the plurality of images, and wherein the respective capture level values are set to be associated with the respective ones of the images and vary in accordance with the respective ones of the images independently of: (i) any attribute or action of a user of the program, and (ii) any event within the program resulting from an action of the user;
   a reference value acquirer configured to acquire a reference value from the program serving as a criterion as to whether or not capture of an image is permitted, wherein the reference value is a numerical magnitude set based on at least one attribute of the user; and
   a capture execution/non-execution controller configured to control respective decisions as to whether or not to execute capture of the respective images displayed on the display unit according to respective results of comparison between the respective numeric magnitudes of the capture level values acquired and the numeric value of the reference value acquired.

2. The capture execution/non-execution control device according to claim 1, wherein the capture execution/non-execution controller controls whether or not to execute capture of the image displayed on the display unit according to a magnitude relationship between the respective numeric magnitudes of the capture level values acquired and the reference value acquired.

3. The capture execution/non-execution control device according to claim 1, further comprising
   a capture permission/prohibition determiner configured to determine whether or not capture of the image displayed on the display unit is permitted according to the result of comparison between the respective numeric magnitudes of the capture level values acquired and the numeric value of the reference value acquired when capture start operation from a user is accepted;
   the capture execution/non-execution controller starting capture of the image displayed on the display unit if it is determined that capture of the image is permitted.

4. The capture execution/non-execution control device according to claim 3, wherein the capture permission/prohibition determiner determines whether or not capture of the image displayed on the display unit is permitted according to the result of comparison between the respective numeric magnitudes of the capture level values acquired and the numeric value of the reference value acquired when capture start operation is accepted and, if capture of the image is prohibited, the capture execution/non-execution controller starts capture of the image displayed on the display unit when a situation in which capture of the image is permitted begins.

5. The capture execution/non-execution control device according to claim 1, wherein
   when the numeric magnitudes of the capture level values that are set are changed, the capture level value acquirer acquires the numeric magnitudes of the capture level values after the change, and
   the capture execution/non-execution controller carries out control to cause a capture image of an image displayed before the change in the numeric magnitudes of the capture level values and a capture image of an image displayed after the change in the numeric magnitudes of the capture level values to be managed in association with chapters different from each other.

6. The capture execution/non-execution control device according to claim 1, wherein the reference value acquirer acquires the numeric value of the reference value according to execution timing of the program.

7. The capture execution/non-execution control device according to claim 1, wherein the program is a program of a game, and the numeric magnitudes of the capture level values are values according to respective scenes in the game.

8. A capture execution/non-execution control method comprising:
   carrying out control to cause a plurality of images generated through execution of a program to be displayed on a display unit;
   acquiring respective capture level values from the program indicating respective degrees of permission or prohibition of capturing the respective ones of the images, wherein the capture level values are numeric magnitudes that are set by a programmer of the program and vary for respective ones of the images between one numerical extreme indicating a high permission to capture a given one of the plurality of images and another numerical extreme indicating a prohibition to capture a given one of the plurality of images, and wherein the respective capture level values are set to be associated with the respective ones of the images and vary in accordance with the respective ones of the images independently of: (i) any attribute or action of a user of the program, and (ii) any event within the program resulting from an action of the user;
   acquiring a reference value from the program serving as a criterion as to whether or not capture of an image is permitted, wherein the reference value is a numerical magnitude set based on at least one attribute of the user; and
   controlling respective decisions as to whether or not to execute capture of the respective images displayed on the display unit according to respective results of comparison between the respective numeric magnitudes of the capture level values acquired and the numeric value of the reference value acquired.

9. An apparatus comprising a computer operating under the control of a computer program, which causes the computer to carry out actions, comprising:
   carrying out control to cause a plurality of images generated through execution of a program to be displayed on a display unit;
   acquiring respective capture level values from the program indicating respective degrees of permission or prohibition of capturing the respective ones of the images, wherein the capture level values are numeric magnitudes that are set by a programmer of the program and vary for respective ones of the images between one numerical extreme indicating a high permission to capture a given one of the plurality of images and another numerical extreme indicating a prohibition to capture a given one of the plurality of images, and wherein the respective capture level values are set to be associated with the respective ones of the images and vary in accordance with the respective ones of the images independently of: (i) any attribute or action of a user of the program, and (ii) any event within the program resulting from an action of the user;

acquiring a reference value from the program serving as a criterion as to whether or not capture of an image is permitted, wherein the reference value is a numerical magnitude set based on at least one attribute of the user; and controlling respective decisions as to whether or not to execute capture of the respective images displayed on the display unit according to respective results of comparison between the respective numeric magnitudes of the capture level values acquired and the numeric value of the reference value acquired.

10. A non-transitory, computer-readable information storage medium in which a computer program is stored, the computer program, when executed by a computer, causes the computer to carry out actions, comprising:

carrying out control to cause a plurality of images generated through execution of a program to be displayed on a display unit;

acquiring respective capture level values from the program indicating respective degrees of permission or prohibition of capturing the respective ones of the images, wherein the capture level values are numeric magnitudes that are set by a programmer of the program and vary for respective ones of the images between one numerical extreme indicating a high permission to capture a given one of the plurality of images and another numerical extreme indicating a prohibition to capture a given one of the plurality of images, and wherein the respective capture level values are set to be associated with the respective ones of the images and vary in accordance with the respective ones of the images independently of: (i) any attribute or action of a user of the program, and (ii) any event within the program resulting from an action of the user;

acquiring a reference value from the program serving as a criterion as to whether or not capture of an image is permitted, wherein the reference value is a numerical magnitude set based on at least one attribute of the user; and controlling respective decisions as to whether or not to execute capture of the respective images displayed on the display unit according to respective results of comparison between the respective numeric magnitudes of the capture level values acquired and the numeric value of the reference value acquired.

* * * * *